A. G. NEVILLE.
AUTOMOBILE SCENIC RAILROAD.
APPLICATION FILED DEC. 15, 1908.
924,182.
Patented June 8, 1909.
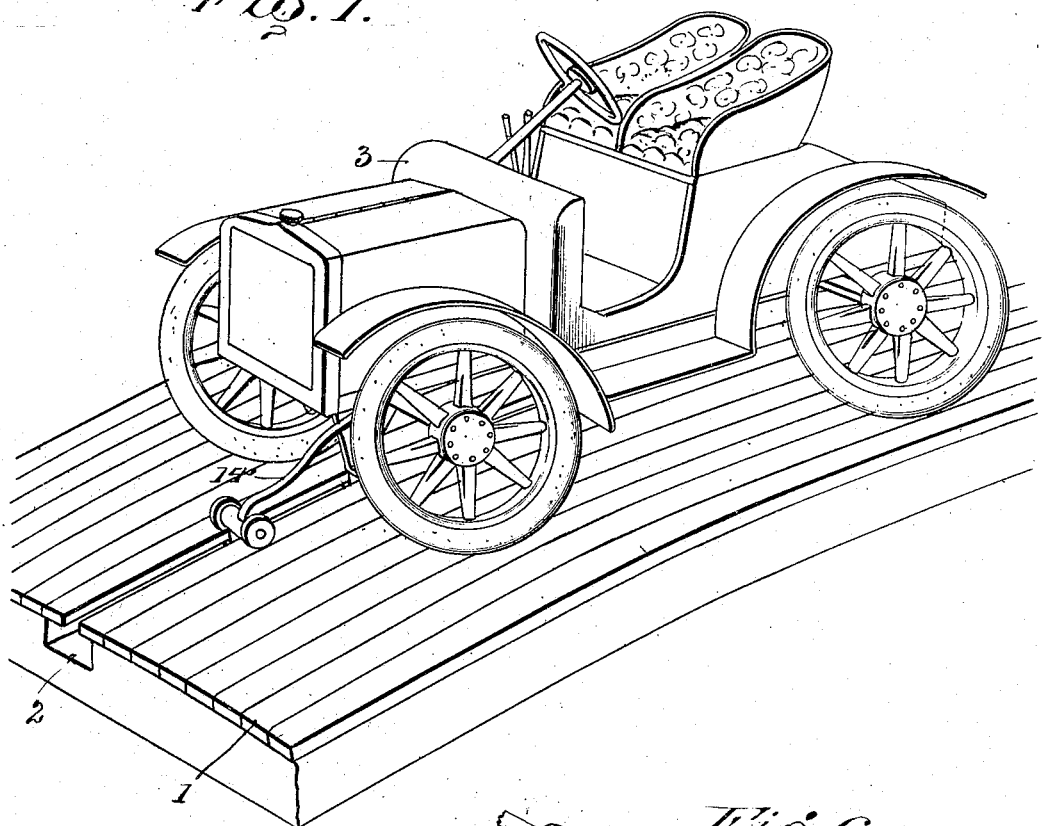
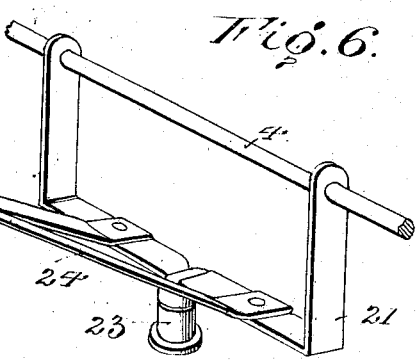
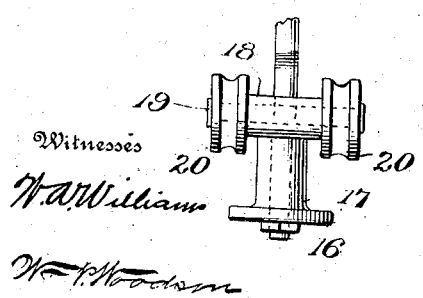

A. G. NEVILLE.
AUTOMOBILE SCENIC RAILROAD.
APPLICATION FILED DEC. 15, 1908.

924,182.

Patented June 8, 1909.

A. G. NEVILLE.
AUTOMOBILE SCENIC RAILROAD.
APPLICATION FILED DEC. 15, 1908.

924,182.

Patented June 8, 1909.
3 SHEETS—SHEET 3.

Witnesses

Inventor
Asa G. Neville
By
Attorneys

UNITED STATES PATENT OFFICE.

ASA G. NEVILLE, OF WELLSBURG, WEST VIRGINIA.

AUTOMOBILE SCENIC RAILROAD.

No. 924,182.  Specification of Letters Patent.  Patented June 8, 1909.

Application filed December 15, 1908. Serial No. 467,647.

*To all whom it may concern:*

Be it known that I, ASA G. NEVILLE, citizen of the United States, residing at Wellsburg, in the county of Brooke and State of West Virginia, have invented certain new and useful Improvements in Automobile Scenic Railroads, of which the following is a specification.

The present invention appertains to amusement devices of the class embodying a track and a car or vehicle mounted to travel upon said track and has for its object to devise novel steering and safety appliances for mechanically and automatically directing the car or vehicle in its travel and retaining the same in place upon the track against casual displacement from any cause.

The form and construction of the track and the design of the car or vehicle are immaterial within the scope of the invention, as the latter relates more particularly to the adjunctive parts coöperating with the track and vehicle, whereby the purposes aforesaid are attained.

Within the purview of the invention it is unimportant as to how the car or vehicle is propelled, whether by gravity, or, positively by means of a motor actuated, either by power generated upon the vehicle, or by power derived from an electric conductor.

Figure 2:
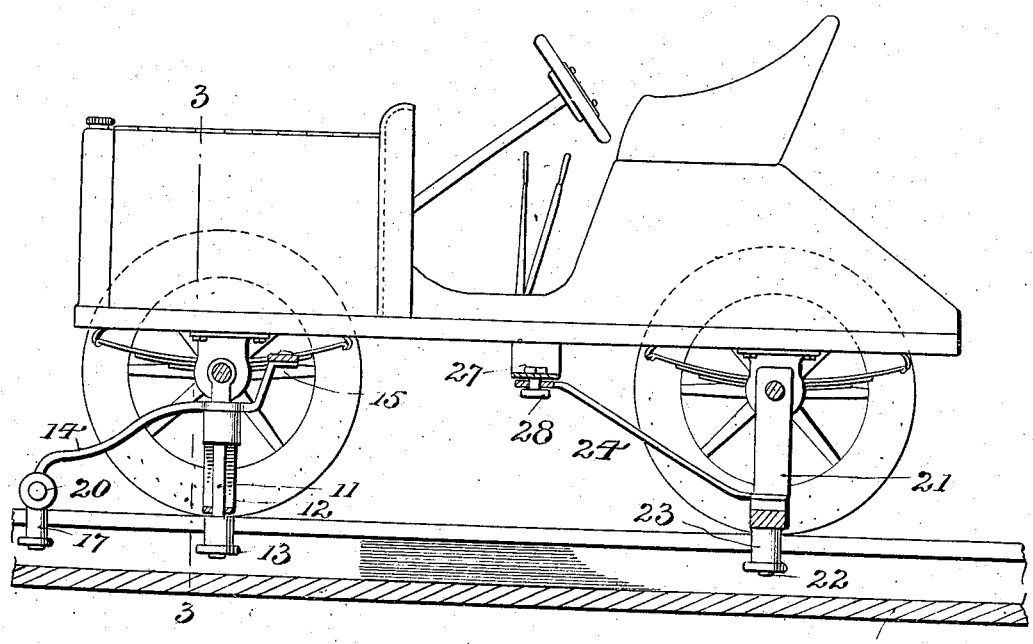
Figure 3:
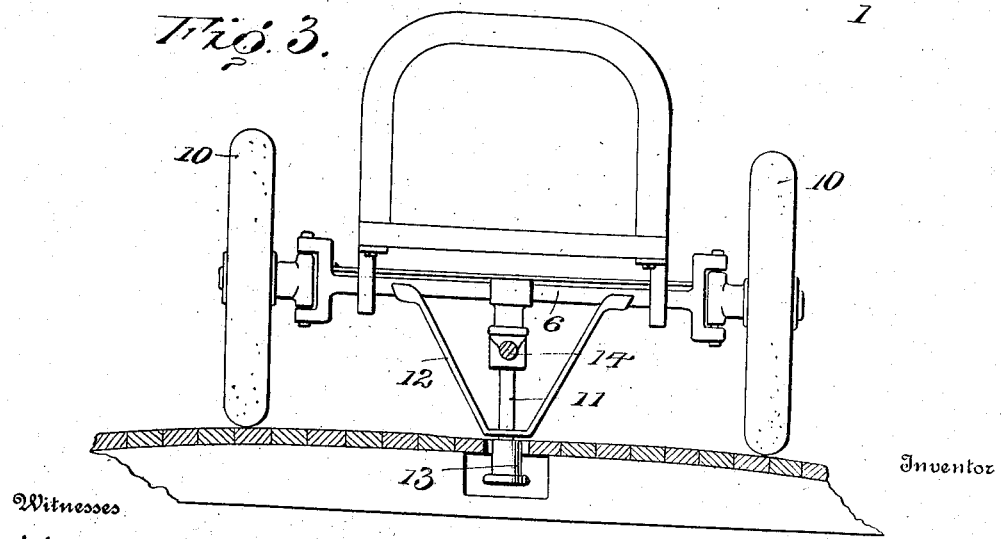
Figure 4:
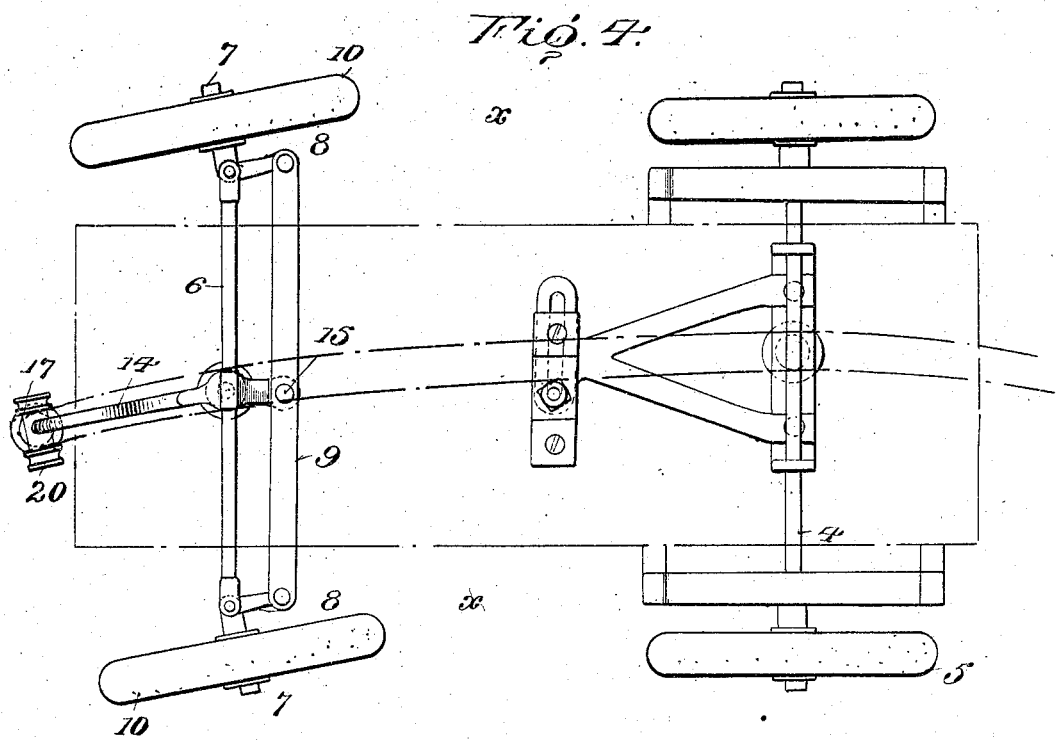
Figure 5:
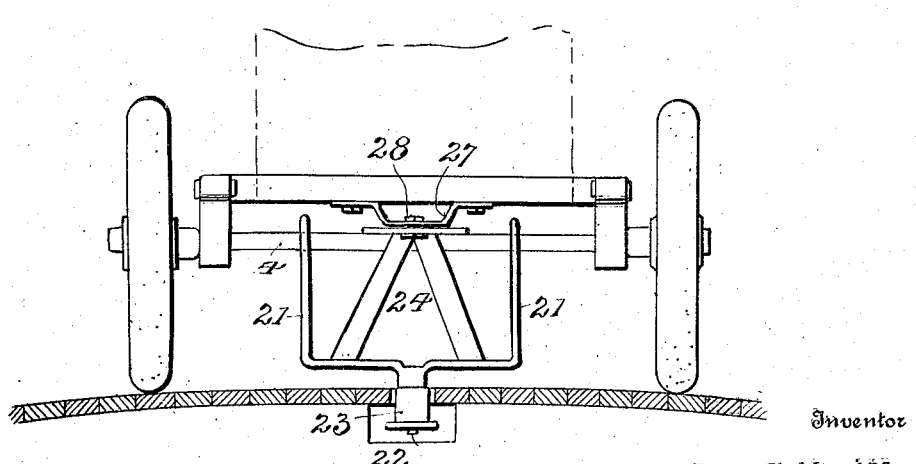

For a full understanding of the invention and the merits thereof and also to acquire a knowledge of the details of construction and the means for effecting the result, reference is to be had to the following description and accompanying drawings, in which:

Figure 1 is a perspective view of a car or vehicle and a portion of track constituting parts of an amusement device embodying the invention; Fig. 2 is a view in elevation of the car, the running gear and track being in vertical central longitudinal section; Fig. 3 is a front view of the car and a portion of the track, the latter being in transverse section; Fig. 4 is a view of the car inverted, the dotted lines showing the slot in the track; Fig. 5 is a transverse section of the car and a portion of the track on the line $x-x$ of Fig. 4 looking to the rear; Fig. 6 is a detail perspective view of the means for holding the rear portion of the car upon the track; and, Fig. 7 is a perspective view of the means for holding the front portion of the car upon the track and directing the front wheels to properly steer the car.

Corresponding and like parts are referred to in the following description and indicated in all the views of the drawings by the same reference characters.

The track 1 may be of any construction such as commonly provided for pleasure railways and may be inclined or level, depending upon the manner of propelling the car or vehicle. It is preferred to have the track curve transversely and to have the center portion highest and formed with a slot 2, so as to receive the arms projecting from the car. By having the track 1 curve transversely, the car automatically centers itself upon the track. No rails are employed, thereby enabling the car to have a certain amount of lateral play, which adds greatly to the excitement of the ride.

The car or vehicle 3 may be of any design or construction and is preferably of the automobile pattern having the accustomed outline and form of this class of vehicle. The rear axle 4 is provided with supporting wheels 5 and is mounted in the accustomed way, so as not to move or turn about a vertical axis. The front axle 6 is provided at its ends with spindles 7 pivoted thereto and provided with arms 8, which are connected by means of a rod or bar 9 to cause both spindles 7 to move in unison. The front wheels 10 are mounted upon the spindles 7 and move therewith. A vertical shaft 11 is pendent from the front portion of the car and is preferably connected at its upper end to the front axle 6 and is strengthened within its lower end by means of a V-brace 12, the latter having the upper ends of its members connected in any substantial way to the axle 6 or other convenient portion of the car. A flanged roller 13 is mounted upon the lower end of the vertical shaft 11 and operates in the slot 2 of the track, the flanged portion of the roller underlapping the longitudinal or edge portions of the track bordering upon the slot 2, so as to prevent vertical displacement of the front portion of the car. The upper portion of the flanged roller 13 operates in the slot 2 thereby preventing lateral movement of the car at its front end.

A steering arm 14 is mounted within its upper rear end upon the upper portion of the vertical shaft 11 and this rear end is pivotally connected to the cross bar 9 at 15. The steering arm 14 extends forwardly and downwardly, its front portion terminating in a vertical extension 16 upon which a flanged roller 17 is mounted, the latter operating in the slot 2 of the track in a manner similar to the flanged roller 13. A cross piece 18 is fitted to the front portion of the steering arm 14 and receives an axle 19 whose ends project beyond the cross piece 18 and receive wheels 20 which are grooved to cause their edge portions to engage positively with the track at each side of the slot 2 and insure movement of the arm 14 so as to properly steer the car. In this connection it is to be understood that the parts are of such relative proportion and arrangement as to insure a proper and positive steering of the car when the same is in motion upon the track. The steering arm turns upon the shaft as an axis, thereby imparting a longitudinal movement to the bar 9 whereby the spindles 7 are turned to direct the front wheels 10 by means of which the car is guided in its movement in the manner well understood.

A frame 21 of approximately U-form is slidably mounted upon the rear axle 4 and is provided at a central point with a pendent journal 22 upon which a flanged roller 23 is mounted, the same being arranged to operate in the slot 2 of the track in substantially the same manner as the flanged rollers 15 and 17 and for a like purpose. Draft arms 24 are connected to the lower horizontal portion of the frame 21 and inclined upwardly and forwardly and are provided at their upper forward ends with a plate 25 in which a longitudinal slot 26 is formed. A bracket 27 is secured to the rear bolster or outer portion of the car and receives a fastening 28 which is arranged to operate in the slot 26 of the plate 25 and prevent vertical movement of said plate without interfering with the limited lateral play of said plate with the frame 21 and draft arms 24. This construction holds the rear portion of the car upon the track while at the same time admitting of such rear portion having a limited lateral play which intensifies the excitement of the occupant of the car when the same is in rapid motion, particularly upon an undulating and sinuous track.

It will be understood from the foregoing that the car is held to the track thereby insuring safety to the pleasure seeker, and that the car when in motion is automatically directed by reason of the steering arm 14 and the parts coöperating therewith. The track may be inclined in which case the car is propelled by gravitative force in the well known manner, but in the event of the track being level the car may be propelled by any power, such as commonly employed for operating pleasure railways and kindred amusement devices.

Having thus described the invention, what is claimed as new is:

1. In combination a track having a slot, a car mounted to travel upon the track, a connecting device between the car and track and having a portion passed through the slot of the latter, and a flanged roller mounted upon said connecting means and adapted to underlap the parts of the track bordering upon the slot formed therein.

2. In combination a track having a slot, a car mounted upon the track and provided with steering wheels, and a steering arm having a portion adapted to enter the slot of the track to positively direct the car in its travel upon the track.

3. In combination a track, a car mounted to travel upon the track, spindles having pivotal connection with the car and provided with supporting wheels, arms projected from the spindles, a bar connecting said arms, a steering arm having connection with said bar and pivotally connected with the car, and operating means between said steering arm and track to move the steering arm to properly direct the car in its travel upon the track.

4. In combination a smooth railless track, a car mounted upon the track and having a limited lateral play, and positive connecting means between the said car and track having running connection with the track and sliding connection with the car to admit of the latter having a limited lateral sliding movement.

5. In combination a track, a car mounted to travel upon the track, a frame having a transverse sliding connection with the car and positive connecting means between said frame and track to prevent displacement of the car from the track when in motion.

6. In combination a track having a slot, a car arranged to travel upon the track, connecting means having attachment with the car, a flanged roller mounted upon said connecting means and arranged to operate in the slot of the track, and wheels mounted upon said connecting means and adapted to travel upon the track upon opposite sides of the slot formed therein.

7. In combination a track having a slot, a car arranged to travel upon the track and provided with steering wheels, connecting means projected from the front and rear portions of the car and entering the slot of the track, flanged rollers mounted upon the lower ends of said connecting means to hold the car upon the track, a steering arm having connection with the steering wheels of the car, and means mounted upon the steering arm and entering the slot of the track to properly direct the car in its travel.

In testimony whereof I affix my signature in presence of two witnesses.

ASA G. NEVILLE. [L. S.]

Witnesses:
Ross J. Jones,
Frank Mutchler.